(12) United States Patent
Park et al.

(10) Patent No.: US 9,332,449 B2
(45) Date of Patent: May 3, 2016

(54) METHOD AND APPARATUS FOR FEEDBACK OF CHANNEL STATE INFORMATION

(71) Applicant: LG Electronics Inc., Seoul (KR)

(72) Inventors: Jong Hyun Park, Gyeonggi-do (KR); Ill Soo Sohn, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 40 days.

(21) Appl. No.: 14/360,232

(22) PCT Filed: Nov. 26, 2012

(86) PCT No.: PCT/KR2012/010023
§ 371 (c)(1),
(2) Date: May 22, 2014

(87) PCT Pub. No.: WO2013/077688
PCT Pub. Date: May 30, 2013

(65) Prior Publication Data
US 2014/0301240 A1    Oct. 9, 2014

Related U.S. Application Data

(60) Provisional application No. 61/563,598, filed on Nov. 24, 2011.

(51) Int. Cl.
*G01R 31/08* (2006.01)
*H04W 24/08* (2009.01)
*H04B 7/06* (2006.01)

(52) U.S. Cl.
CPC ............. *H04W 24/08* (2013.01); *H04B 7/0643* (2013.01); *H04B 7/0658* (2013.01)

(58) Field of Classification Search
CPC .............................. H04W 24/08; H04W 4/00
USPC ........... 370/252–253, 328–339; 375/262–267
See application file for complete search history.

(56) References Cited

U.S. PATENT DOCUMENTS

| 2010/0271992 | A1 | 10/2010 | Wentink et al. | |
| 2011/0116488 | A1* | 5/2011 | Grandhi | H04B 7/0626 370/338 |
| 2011/0199946 | A1 | 8/2011 | Breit et al. | |
| 2012/0026909 | A1* | 2/2012 | Seok | H04B 7/0417 370/252 |
| 2013/0107916 | A1* | 5/2013 | Liu | H04B 7/0452 375/219 |

FOREIGN PATENT DOCUMENTS

KR    1020090031434 A    3/2009
KR    1020100067894 A    6/2010

* cited by examiner

*Primary Examiner* — Iqbal Zaidi
(74) *Attorney, Agent, or Firm* — Dentos US LLP

(57) ABSTRACT

Disclosed are a method and an apparatus for feed back of channel state information. The method for transmitting channel state information comprises the steps of: receiving a null data packet (NDP) frame; calculating signal to noise ratio (SNR) information based on subcarrier information of at least one spatial stream via which the NDP frame is transmitted; and calculating a compressed beamforming feedback matrix including channel state information based on the information on the subcarrier used in transmitting the spatial stream. Thus, accurate feedback information is calculated from a frequency selective channel and utilized to enable the efficient utilization of frequency resources.

6 Claims, 8 Drawing Sheets

METHOD AND APPARATUS FOR FEEDBACK OF CHANNEL STATE INFORMATION

CROSS-REFERENCE TO RELATED APPLICATIONS

This application is a 35 U.S.C. §371 National Stage entry of International Application No. PCT/KR2012/010023, filed Nov. 26, 2012, which claims the benefit of priority of U.S. Provisional application 61/563,598 filed on Nov. 24, 2011, both of which are incorporated by reference in their entirety herein.

BACKGROUND OF THE INVENTION

1. Field of the Invention

The present invention relates to wireless communication and more particularly, a method and an apparatus for providing feedback of channel state information.

2. Related Art

Machine-to-Machine (M2M) systems are getting attention as the next-generation communication technology. The IEEE 802.11 WLAN working group is pursuing development of a new standard to support the M2M systems. An M2M system refers to a network enabling exchange of information among machines with no human involved. Temperature sensor, humidity sensor, camera, consumer product such as TV, manufacturing machine in a factory, and even large-sized machine such as an automobiles can be counted as one element of the M2M system. With the advent of communication services such as smart grid, e-Health, and ubiquitous communication, M2M technology is becoming more accepted to support such services. A few important features of the M2M system can be summarized as follows.

1) Large number of stations: different from existing networks, the M2M technology assumes a large number of stations. This is so because the M2M technology inherently takes into account all of the possible sensors installed at home and office as well as the machines owned by individuals. Therefore, a considerable number of stations can be connected to a single Access Point (AP).

2) Low traffic load per station: since an M2M device has a traffic pattern of gathering and reporting information of the surroundings, frequent transmission of information is not necessary and the amount of information transmitted is relatively small.

3) Uplink-oriented: in most cases, M2M devices are so structured that they receive a command via downlink transmission, carry out the corresponding actions, and report the resulting data via uplink transmission. Since most of data are delivered through uplink transmission, uplink transmission becomes a primary means for M2M communication.

4) Station's long life expectancy: M2M devices are usually battery-powered and therefore, it is not easy for a user to charge them frequently. In this regard, any M2M device is required to guarantee a long life expectancy by minimizing battery consumption.

5) Automatic recovery function: since direct operation of M2M devices may not be accessible for humans in some cases, automatic recovery is necessary.

SUMMARY OF THE INVENTION

One object of the present invention is to provide a method for providing feedback of channel state information.

Another object of the present invention is to provide an apparatus which carries out a method for providing feedback of channel state information.

To achieve the objective described above, a method for transmitting channel state according to one aspect of the present invention comprises receiving a Null Data Packet (NDP) frame; calculating Signal-to-Noise Ratio (SNR) information based on sub-carrier information of at least one spatial stream which has transmitted the NDP frame; and based on sub-carrier information used to transmit the spatial stream, calculating a compressed beamforming feedback matrix including channel state information. The SNR information based on sub-carrier information with respect to the at least one spatial stream can correspond to SNR information with respect to each sub-carrier used to transmit the spatial stream. The SNR information based on sub-carrier information with respect to the at least one spatial stream can be difference information between SNR information with respect to each sub-carrier used to transmit the spatial stream and an average SNR of sub-carriers used to transmit the spatial stream. The SNR information based on sub-carrier information with respect to the at least one spatial stream can be SNR information with respect to a sub-carrier corresponding to a pre-determined sub-carrier index among sub-carriers used to transmit the spatial stream. The compressed beamforming feedback matrix can be a compressed beamforming feedback matrix with respect to a sub-carrier corresponding to a pre-determined sub-carrier index among sub-carriers used to transmit the spatial stream. The method for transmitting channel state comprises receiving a Null Data Packet Announcement (NDPA) frame; based on recommended grouping information included in the NDPA frame, determining a sub-carrier index of the at least one spatial stream from which the SNR is calculated; and determining a sub-carrier index of the at least one spatial stream from which the compressed beamforming feedback matrix is calculated, where the recommended grouping information can be the information about grouping carried out for a sub-carrier of the at least one spatial stream to calculate feedback information. The method for transmitting channel state can comprise receiving an NDPA frame; and based on tone shift information included in the NDPA frame, changing a sub-carrier of the at least one spatial stream from which the SNR is calculated and a sub-carrier index of the at least one spatial stream from which the compressed beamforming feedback matrix is calculated. The method for transmitting channel state further comprises transmitting grouping information of supported sub-carriers, where the grouping information of supported sub-carriers can be the information about performance of grouping sub-carriers supported by an M2M terminal.

A terminal according to another aspect of the present invention comprises a processor and a transceiver. The transceiver is configured to receive a Null Data Packet (NDP) frame; and the processor is configured to calculate Signal-to-Noise Ratio (SNR) information base on sub-carrier information of at least one spatial stream which has transmitted the received NDP frame and to calculate a compressed beamforming feedback matrix with respect to the information of a sub-carrier used to transmit the spatial stream. The SNR information based on sub-carrier information with respect to the at least one spatial stream can be SNR information with respect to each sub-carrier used to transmit the spatial stream. The SNR information based on sub-carrier information with respect to the at least one spatial stream can be difference information between SNR information with respect to each sub-carrier used to transmit the spatial stream and an average SNR of sub-carriers used to transmit the spatial stream. The SNR information based on sub-carrier information with respect to the at least one spatial stream can be SNR information with respect to a sub-carrier corresponding to a predetermined sub-carrier index among sub-carriers used to transmit the spatial stream. The compressed beamforming feedback can be a compressed beamforming feedback matrix with respect to a sub-carrier corresponding to a predetermined sub-carrier index among sub-carriers used to transmit the spatial stream. The transceiver is configured to receive an NDPA frame or a beamforming report poll frame; and the processor is configured to determine a sub-carrier index of the at least one spatial stream from which the SNR is calculated, based in recommended grouping information included in the NDPA frame or beamforming report poll frame and to determine a sub-carrier index of the at least one spatial stream from which the compressed beamforming feedback matrix is calculated, where the recommend grouping information can be the information about grouping carried out for the sub-carrier of the at least one spatial stream to calculate feedback information. The transceiver is configured to receive an NDPA frame or beamforming report poll frame; and the processor is configured to change a sub-carrier of the at least one spatial stream from which the SNR is calculated based on tone shift information included in the NDPA frame or beamforming report poll frame and a sub-carrier index of the at least one spatial stream from which the compressed beamforming feedback matrix is calculated. The transceiver is configured to transmit grouping information of supported sub-carriers, and the grouping information of supported sub-carriers can be the information about performance of grouping sub-carriers supported by an M2M terminal.

According to a method and an apparatus for providing feedback of channel state information of the present invention, in transmitting feedback information of a spatial stream, frequency resources can be utilized in an efficient manner by using a method for providing feedback information for the whole sub-carriers employed by a spatial stream or by using a method for providing feedback information of a particular sub-carrier among the whole sub-carriers and utilizing precise feedback information from a frequency selective channel.

DESCRIPTION OF EXEMPLARY EMBODIMENTS

A method for transmitting feedback information according to an embodiment of the present invention can be applied to devices such as M2M systems that operate in the frequency band below 1 GHz defined in the IEEE 802.11ah or 802.11af standard. However, the present invention is not limited only to M2M systems but can be applied equally to ordinary Wireless Local Area Network (WLAN) systems (or Wi-Fi networks) as far as the application falls within the technical scope of the present invention.

Communication in the frequency band below 1 GHz (sub 1 GHz), due to the nature of the communication, provides considerably larger coverage than the WLAN widely used in an indoor environment. The frame structure of the physical layer used in the frequency band below 1 GHz can be created simply by $1/10$ down-clocking of the frame structure defined in the IEEE 802.11ac. The frame used in the channel bandwidth of 20/40/80/160/80+80 MHz of the IEEE 802.11ac can be used in the channel bandwidth of 2/4/8/16/8+8 MHz of the sub 1 GHz band through $1/10$ downclocking. It is necessary to receive from an Access Point (AP) feedback information accurate with channel state for effective data transmission through a Multiple Input Multiple Output (MIMO) scheme in a limited frequency spectrum. For example, in generating feedback used for an STA to transmit channel state information to an AP, accuracy of generated feedback information can vary depending on whether the unit of generating feedback is a sub-carrier, a unit intended for a particular sub-carrier, or a channel unit. In what follows, a method for generating feedback information about channel state according to an embodiment of the present invention will be described.

Figure 1:
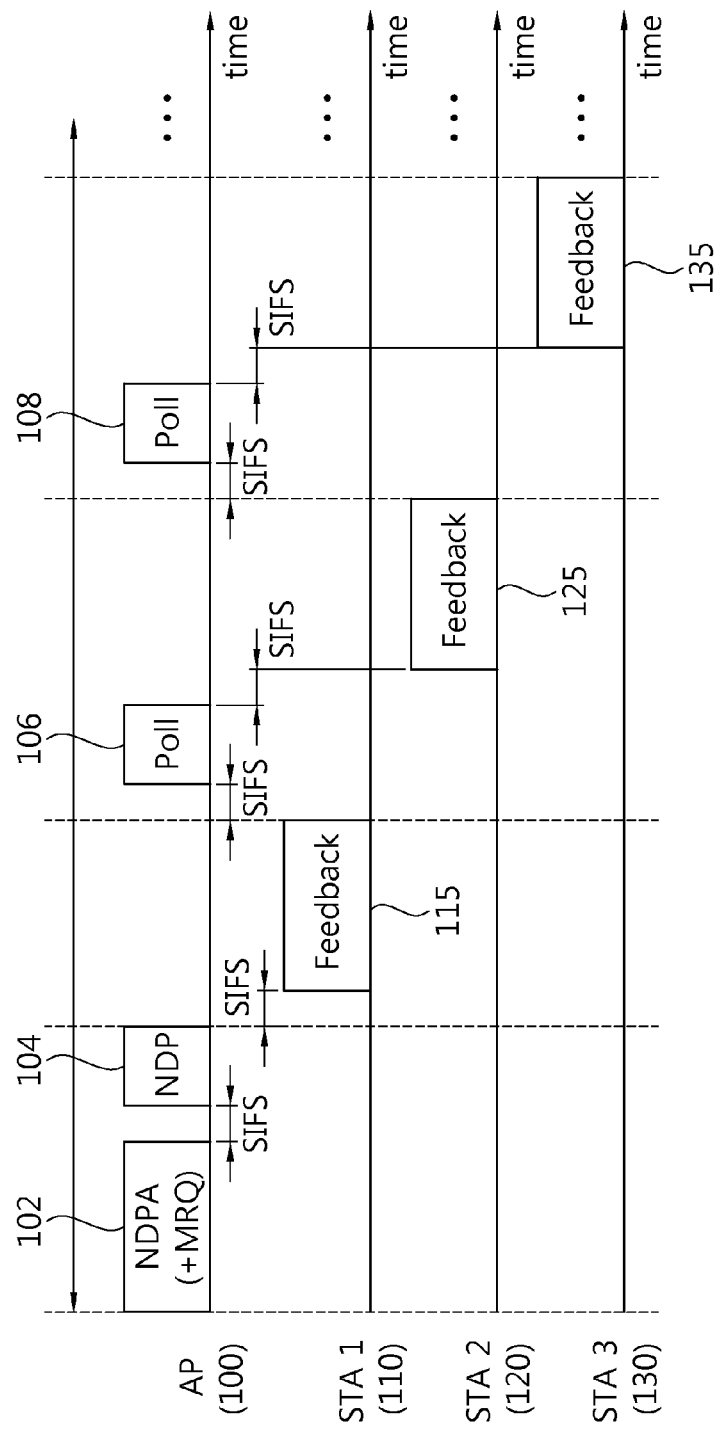
FIG. 1 illustrates a channel sounding method employing a Null Data Packet (NDP) in a Very High Throughput (VHT) wireless LAN system according to an embodiment of the present invention.

FIG. 1 illustrates a channel sounding method employing a Null Data Packet (NDP) in a Very High Throughput (VHT) wireless LAN system according to an embodiment of the present invention.

Disclosed in FIG. 1 is a method for generating and transmitting feedback information corresponding to channel state information between AP 100 and STA 110, 120, 130 based on sounding protocol. Sounding protocol or channel sounding can refer to a procedure of receiving feedback of channel state information.

For example, in case the AP 100 performs Downlink Multi-user Multiple Input Multiple Output (DL-MU MIMO) scheme, the AP 100 has to receive feedback of downlink channel state information from the respective STAs 110, 120, 130.

The channel state information between the AP 100 and the STA 110, 120, 130 based on sounding protocol can be carried out through the following steps.

(1) AP(100) transmits NDPA(null data packet announcement, 102) frame.

The NDP Announcement (NDPA) frame 102 is a frame intended to indicate initiation of channel sounding and transmission of a Null Data Packet (NDP) frame 104. Different transmission methods can be used to transmit the NDPA frame 102 in the case of transmitting data by employing Multi-User Multiple Input Multiple Output (MU-MIMO) scheme or Single User Multiple Input Multiple Output (SU-MIMO) scheme.

For example, in case channel sounding is performed based on MU-MIMO scheme, the NDPA frame 102 is broadcast to at least one or more target STAs. On the other hand, in the case of channel sounding for SU-MIMO scheme, the NDPA frame 102 is unicast to a single target STA.

Table 1 shows an STA information field format included in the NDPA frame 102.

TABLE 1

| Sub-field | Description |
|---|---|
| AID | Includes AID of a sounding target station |
| Feedback type | Indicates feedback request type for a sounding target station<br>'0' in the case of SU-MIMO<br>'1' in the case of MU-MIMO |
| Nc Index | Indicates feedback dimension requested<br>In the case of MU-MIMO:<br>'0' in case Nc = 1<br>'1' in case Nc = 2<br>'2' in case Nc = 3<br>'3' in case Nc = 4<br>'4' in case Nc = 5<br>'5' in case Nc = 6<br>'6' in case Nc = 7<br>'7' in case Nc = 8<br>Reserved sub-field (set to 0) in the case of SU-MIMO |

The STAs 110, 120, 130 which have received the NDPA frame 102 checks the AID sub-field value included in the STA information field and checks whether they are sounding target STAs.

(2) The AP 100 transmits the NDP frame 104.

The NDP frame 104 can be created from the PPDU format by removing the data field thereof. Each STA 110, 120, 130 obtains downlink channel state information based on the training field included in the NDP frame 104 and creates feedback information to be transmitted to the AP 100.

(3) The STA1 110 transmits feedback information 115 to the AP 100.

The feedback information can be, for example, a VHT compressed beamforming frame. The VHT compressed beamforming frame can include an SNR value about a space-time stream, information of a compressed beamforming feedback matrix about a sub-carrier, and so on. Further description of the VHT compressed beamforming frame will be provided below.

STA1 110 can transmit a VHT compressed beamforming frame, which includes downlink channel information between the STA1 110 and the AP 100, to the AP 100.

(4) The AP 100 transmits a feedback poll frame to the STA2 120, and the STA2 120 transmits feedback information to the AP 100.

The feedback poll frame, transmitted from the AP 100, is a frame requesting feedback and can be transmitted to an STA to request feedback. The STA2 120, in response to the feedback poll frame 106, can transmit the VHT compressed beamforming frame, which includes downlink channel information between the STA2 120 and the AP 100, to the AP 100.

(5) The AP 100 transmits a feedback poll frame to the STA3 130, and the STA3 130 transmits feedback information to the AP 100.

The feedback information transmitted from the STA 110, 120, 130 can have a different value according to on which criterion the feedback value is calculated. Also, the feedback information can be calculated with different complexity and different channel state information accuracy according to the range in which the feedback is calculated. For example, in case one frequency band is divided into a plurality of channels, multiple channels can be defined for a single frequency band. Also, in the case of a channel access method based on OFDM, multiple sub-carriers can be defined for a single channel. In other words, different feedback values can be obtained according to on which unit the feedback information is calculated.

For example, suppose a channel exhibits frequency selective characteristics. Then, within a predetermined frequency band, a plurality of channels can be defined, through which the AP 100 and the STA 110, 120, 130 can communicate data with each other, and channel state of each channel can be different from each other. Moreover, it may be the case that channel state can be different for each sub-carrier allocated along the frequency axis within one channel. In this case, channel-based feedback information can differ from the sub-carrier based feedback information.

Figure 2:
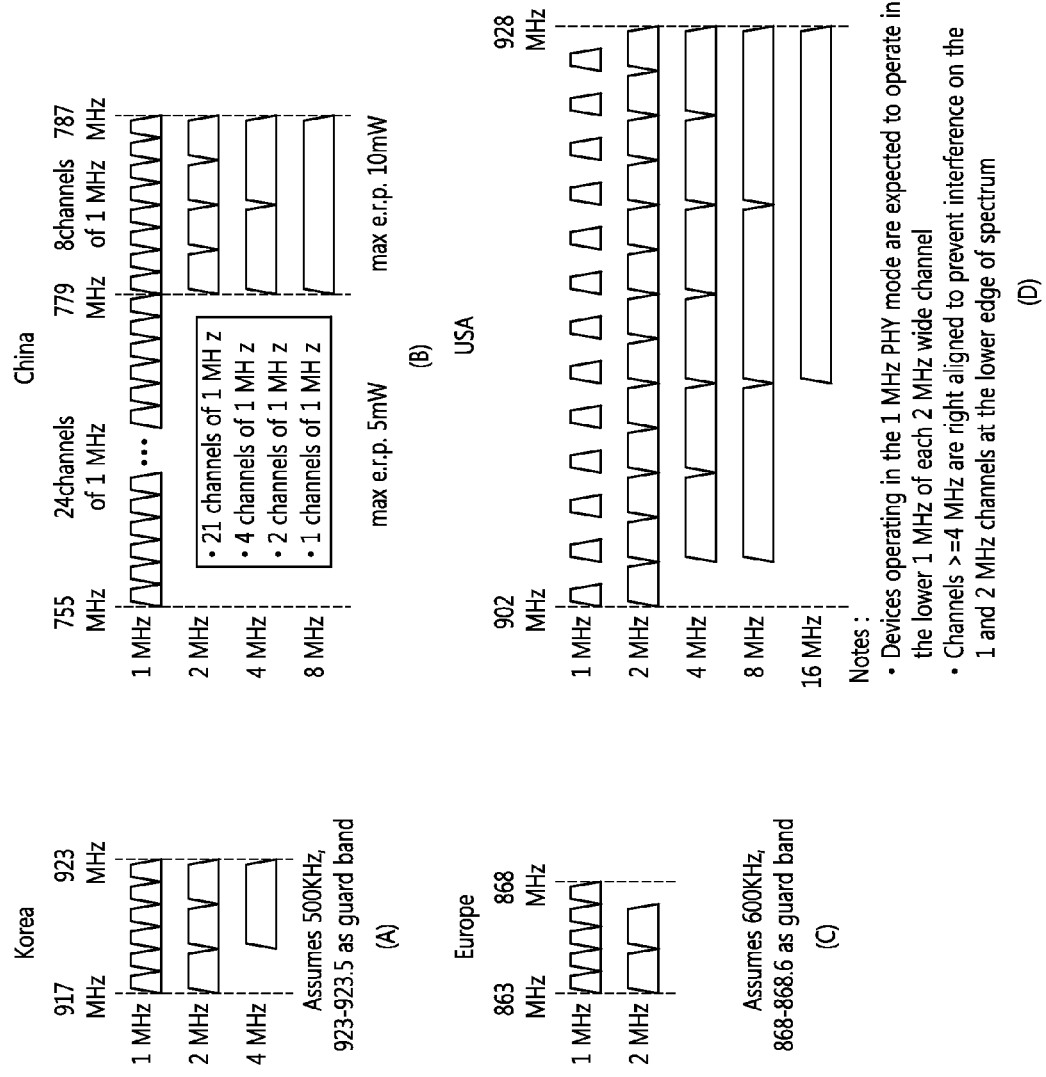
FIG. 2 illustrates frequency bandwidth and channels employed by individual countries or a federation of particular countries according to an embodiment of the present invention.

FIG. 2 illustrates frequency bandwidth and channels employed by individual countries or a federation of particular countries according to an embodiment of the present invention.

FIG. 2 shows wireless LAN channels adopted by individual countries, which belong to the frequency band below 1 GHz specified in the IEEE 802.11ah.

Korea, for example, reserves a frequency band in the range from 917 MHz to 923 MHz as the frequency band for communicating data among 802.11ah devices (see FIG. 2(A)). In the case of the frequency band in the range from 917 MHz to 923 MHz, frequency bandwidth of 6 MHz is formed; when a frequency band of 1 MHz is allocated to each channel, six channels can be established in the range from 917 MHz to 923 MHz.

As a different example, in case a channel is assigned to the frequency band of 2 MHz, three channels can be formed in the frequency range from 917 MHz to 923 MHz.

Frequency bands available in the sub-1 GHz band are different for each country and each region. Thus a channelization method different from each other can be adopted. In the case of US (FIG. 2(D)), which has the largest frequency band available, multiple channels are allocated by defining channel bandwidth to range from the smallest channel bandwidth of 1 MHz to the largest channel bandwidth of 16 MHz. To ensure compatibility with existing WLAN system (for example, the IEEE 802.11ac), the IEEE 802.11ah system defines data communication employing very narrow channel bandwidth.

In the case of the IEEE 802.11ah which employs narrow frequency bandwidth, a relative communication range is extended, providing large coverage. In the case of large communication range, an M2M environment, where a plurality of STAs is connected to one AP, can be established.

As indicated above, for the IEEE 802.11ah system in which data communication is performed with narrow frequency bandwidth, there needs a frequency selective method to utilize a frequency spectrum effectively.

Figure 3:
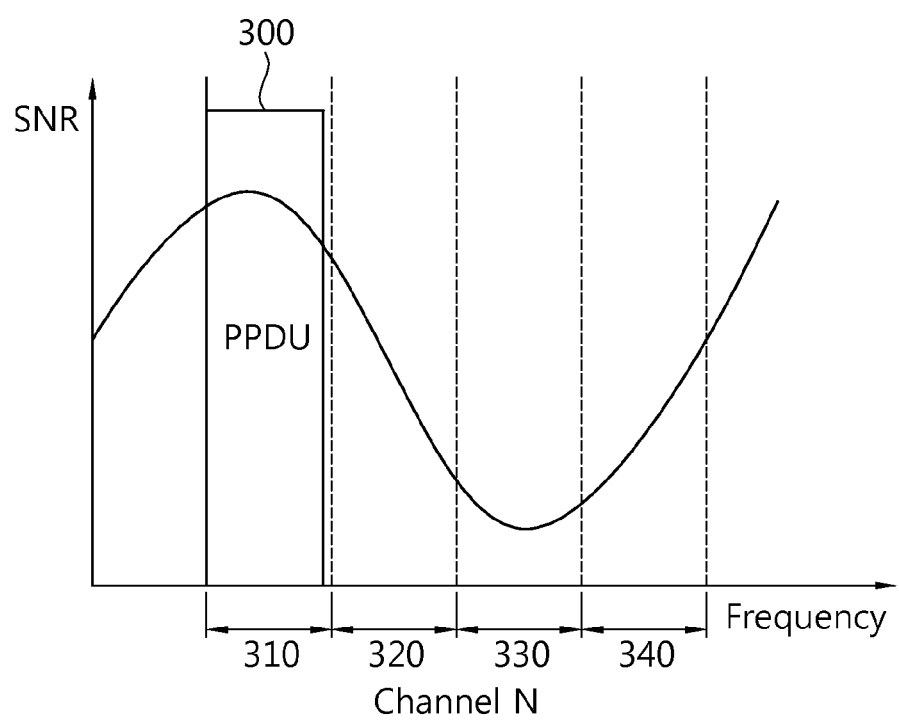
FIG. 3 illustrates a method for transmitting a Physical Protocol Data Unit (PPDU) based on a frequency selective transmission method according to an embodiment of the present invention.

FIG. 3 illustrates a method for transmitting a Physical Protocol Data Unit (PPDU) based on a frequency selective transmission method according to an embodiment of the present invention.

FIG. 3 assumes that transmission bandwidth is 8 MHz and the frequency band is divided into four channels of 2 MHz each 310, 320, 330, 340.

With reference to FIG. 3, for example, in case the AP requests the STA for feedback information, channel state information for each channel can be known based on the channel state information transmitted from the STA. In case the first channel 310 among the four channels reveals the highest SNR value, the AP can transmit and receive data 300 through the first channel. When channel condition is changed afterwards, the AP can continue transmitting and receiving data by utilizing a different channel.

In other words, to make the maximum use of a limited frequency spectrum, frequency selective transmission can be carried out. If the whole Basic Service Set (BSS) is operated based on a single narrow channel even when narrow-channel transmission is employed, channel interference and fading risk may increase.

In what follows, disclosed is a method for calculating channel state information to improve transmission efficiency in a frequency selective channel according to an embodiment of the present invention with respect to transmission of channel state information through a VHT compressed beamforming frame.

Figure 4:
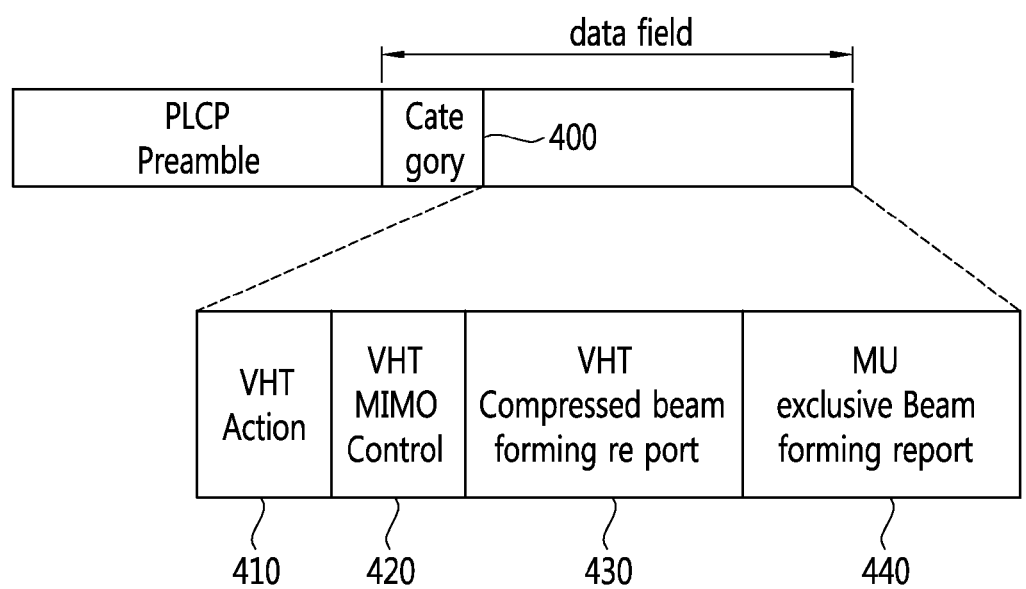
FIG. 4 illustrates a VHT compressed beamforming frame according to an embodiment of the present invention.

FIG. 4 illustrates a VHT compressed beamforming frame according to an embodiment of the present invention.

With reference to FIG. 4, the data field of a VHT compressed beamforming frame comprises a category 400, VHT action 410, VHT MIMO control 420, VHT compressed beamforming report 430, and MU exclusive beamforming report 440.

The category 400 can be used to indicate that a current frame is a VHT action frame.

The VHT action 410 can be used to indicate to which specific VHT action frame a current frame corresponds.

The VHT MIMO control 420 is the field carrying information required to carry out beamforming feedback, comprising the number of rows and columns of a beamforming feedback matrix, channel bandwidth information, grouping information, codebook information, MIMO information, and so on. Table 8-ac4 of 8.4.1.37 VHT MIMO control field of the IEEE P802.11ac™/D1.0 Draft STANDARD for Information Technology—Telecommunications and information exchange between systems—Local and metropolitan area networks—Specific requirements Part 11: Wireless LAN Medium Access Control (MAC) and Physical Layer (PHY) specifications Amendment 4: Enhancements for Very High Throughput for Operation in Bands below 6 GHz, which was published at May, 2011, describes the information above.

The MU exclusive beamforming report field 440 is intended to transmit SNR information with respect to a spatial stream in the case of MU-MIMO transmission.

The VHT compressed beamforming report 430 can include SNR information and information about beamforming feedback matrix with respect to a space-time stream used for data transmission.

Table 2 shows a conventional VHT compressed beamforming report field 430.

With reference to Table 2, the existing VHT compressed beamforming report field 430 can include average SNR of each space-time stream and a beamforming feedback matrix V for each sub-carrier k=scidx (0~Ns−1). The beamforming feedback matrix is a matrix including information about channel state and can be used to calculate a channel matrix for an MIMO-based transmission method.

In Table 2, Ns can be the number of sub-carriers which transmits the compressed beamforming feedback matrix to the beamformer. A beamformee, by using a grouping method, can reduce the number of sub-carriers Ns which transmits the compressed beamforming feedback matrix. For example, the number of beamforming feedback matrices provided as feedback information can be reduced by using a method which groups a plurality of sub-carriers into one group and transmits a compressed beamforming feedback matrix for the corresponding group.

In Table 2, Ng can represent the number of groups in which beamforming feedback matrices are transmitted. Ns can be calculated from the channel bandwidth and grouping information included in the VHT MIMO control field.

An average SNR with respect to each space-time stream of Table 2 can be calculated as shown in Table 3.

TABLE 3

| Average SNR of Space-Time Stream i subfield | AvgSNRi |
| --- | --- |
| −128 | −10 dB |
| −127 | −9.75 dB |
| −126 | −9.5 dB |
| +126 | −53.5 dB |
| +127 | −53.75 dB |

With reference to Table 3, an average SNR for each stream-space stream is obtained by calculating an average SNR for the whole sub-carriers included in the corresponding channel and transmitting the average SNR for each stream after mapping the calculated average SNR into the range of −128 to 128.

In other words, a beamforming report method for an SU-MIMO channel in the existing VHT system can transmit an average SNR for each spatial stream by allocating 8 bits to the average SNR as shown in Table 4.

The beamforming feedback matrix transmits a compressed beamforming feedback matrix V for each sub-carrier index rather than an average for each spatial stream. In other words,

TABLE 2

| Field | Size(bit) | Meaning |
| --- | --- | --- |
| Average SNR of Space-Time Stream1 | 8 | signal-to-noise ratio at the beamformee for space-time stream 1 averaged over subcarriers. See Table 3 Average SNR of Space-Time stream s subfield |
| Average SNR of Space-Time Stream Nc | 8 | signal-to-noise ratio at the beamformee for space-time stream 1 averaged over subcarriers. See Table 3 Average SNR of Space-Time stream s subfield |
| Beamforming Feedback Matrix V for subcarrier k = scidx(0) | $N_a \times (b_\psi + b_\phi)/2$ | Compressed beamforming feedback matrix as defined in Table(order of angles in the compressed beamforming feedback matrix subfield) |
| Beamforming Feedback Matrix V for subcarrier k = scidx(1) | $N_a \times (b_\psi + b_\phi)/2$ | Compressed beamforming feedback matrix as defined in Table(order of angles in the compressed beamforming feedback matrix subfield) |
| Beamforming Feedback Matrix V for subcarrier k = scidx(2) | $N_a \times (b_\psi + b_\phi)/2$ | Compressed beamforming feedback matrix as defined in Table(order of angles in the compressed beamforming feedback matrix subfield) |
| Beamforming Feedback Matrix V for subcarrier k = scidx(Ns − 1) | $N_a \times (b_\psi + b_\phi)/2$ | Compressed beamforming feedback matrix as defined in Table(order of angles in the compressed beamforming feedback matrix subfield) | a different matrix V, which takes into account frequency selective characteristics for each sub-carrier, can be generated from the beamforming feedback matrix and transmitted to an AP. However, feedback of the SNR value is transmitted in such a way that an average SNR value for each channel is transmitted for each stream.

As described above, in case sub 1 GHz communication is carried out as in the IEEE 802.11ah standard, frequency band of a channel used for frame transmission can be a narrow band. In this case, frequency selective transmission with respect to a narrow band may be effective. In other words, to carry out frequency selective transmission, it is necessary to report for each sub-carrier not only a beamforming feedback matrix but also the SNR value for each stream.

A method for providing channel information feedback according to an embodiment of the present invention can be used as an effective beamforming report method for those devices operating in the sub 1 GHz (S1G) frequency band as in the 802.11ah standard. In a method for providing channel information feedback according to an embodiment of the present invention, the SNR value for each spatial stream can also use a report method intended for each sub-carrier.

Table 4 shows a method for transmitting SNR information of a spatial stream for each sub-carrier.

TABLE 4

| Field | Size(bit) | Meaning |
|---|---|---|
| Delta SNR for space-time stream 1 for subcarrier k = scidx(0) | 4 | $\Delta SNR_{scidx(0),1}$ as defined in Equation 1 |
| Delta SNR for space-time stream Nc for subcarrier k = scidx(0) | 4 | $\Delta SNR_{scidx(0),Nc}$ as defined in Equation 1 |
| Delta SNR for space-time stream 1 for subcarrier k = scidx(1) | 4 | $\Delta SNR_{scidx(1),1}$ as defined in Equation 1 |
| Delta SNR for space-time stream Nc for subcarrier k = scidx(1) | 4 | $\Delta SNR_{scidx(1),Nc}$ as defined in Equation 1 |
| Delta SNR for space-time stream 1 for subcarrier k = scidx(Ns' − 1) | 4 | $\Delta SNR_{scidx(N_{s'}-1),1}$ as defined in Equation 1 |
| Delta SNR for space-time stream Nc for subcarrier k = scidx(Ns' − 1) | 4 | $\Delta SNR_{scidx(N_{s'}-1),Nc}$ as defined in Equation 1 |

Table 4 shows a method for reporting SNR value of a spatial stream for each sub-carrier. With reference to Table 4, the SNR value ($\Delta SNR_{k,i}$) with respect to each sub-carrier can be calculated according to Eq. 1 shown below.

$$\Delta SNR_{k,i} = 10\log_2\left(\frac{\|H_k V_{k,i}\|^2}{N}\right) - \overline{SNR_i} \quad \text{[Eq. 1]}$$

where $H_k$ is the estimated MIMO channel for subcarrier $k$ $V_{k,i}$ is column $i$ of the beamforming matrix $V$ for subcarrier $k$ $N$ is the average noise plus interference power measured at the beamformee that was used to calculate $\overline{SNR_i}$ $\overline{SNR_i}$ is the average SNR of space-time stream $i$ reported in the VHT compressed beamforming reporte field(Average SNR in Space-Time Stream $i$ field)

With reference to Eq. 1, the SNR value transmitted for each sub-carrier can correspond to the value obtained by subtracting an average SNR value with respect to the whole sub-carriers of the corresponding stream from the SNR value with respect to a particular sub-carrier. By using a method for transmitting residual information from the SNR average value of a spatial stream, overhead due to transmission of SNR information for each sub-carrier can be reduced.

Hk is MIMO channel information predicted with respect to a sub-carrier k.

Vk i is the i-th column of a beamforming matrix V with respect to the sub-carrier k.

N represents noise and interference power value used for a beamformee to calculate $\overline{SNR_i}$.

$\overline{SNR_i}$ is average SNR information of a space-time stream reported by the VHT compressed beamforming report field.

Again with respect to Table 4, a method for channel information transmission according to an embodiment of the present invention can use a method for calculating SNR of each sub-carrier with respect to individual spatial streams.

The method above is only an example, and another method for transmitting SNR information of a sub-carrier used in each spatial stream can be employed.

Table 5 shows another example illustrating a method for reporting an SNR value of a spatial stream with respect to each sub-carrier.

TABLE 5

| Field | Size(bit) | Meaning |
|---|---|---|
| SNR for space-time stream 1 for subcarrier k = scidx(0) | 8 | Signal to noise ratio at the beamformee for space-time stream 1 for k = scidx(0) as defined in table 3(average SNR of space-time stream s subfields |
| Delta SNR for space-time stream Nc for subcarrier k = scidx(0) | 8 | Signal to noise ratio at the beamformee for space-time stream Nc for k = scidx(0) as defined in table 3(average SNR of space-time stream s subfield) |
| Delta SNR for space-time stream 1 for subcarrier k = scidx(1) | 8 | Signal to noise ratio at the beamformee for space time stream 1 for k = scidx(1) as defined in table 3(average SNR of space-time stream s subfield) |
| Delta SNR for space-time stream Nc for subcarrier k = scidx(1) | 8 | Signal to noise ratio at the beamformee for space-time stream 1 for k = scidx(1) as defined in table 3(average SNR of space-time stream s subfield) |
| Delta SNR for space-time stream 1 for subcarrier k = scidx(Ns − 1) | 8 | Signal to noise ratio at the beamformee for space-time stream 1 for k = scidx(Ns − 1) as defined in table 3(average SNR of space-time stream s subfield) |
| Delta SNR for space-time stream Nc for subcarrier k = scidx(Ns − 1) | 8 | Signal to noise ratio at the beamformee for space-time stream Nc for k = scidx(0) as defined in table 3(average SNR of space-time stream s subfield) |
| Beamforming Feedback Matrix V for subcarrier k = scidx(0) | $N_a \times (b_\psi + b_\phi)/2$ | Compressed beamforming feedback matrix as defined in Table(order of angles in the compressed beamforming feedback matrix subfield) |

TABLE 5-continued

| Field | Size(bit) | Meaning |
|---|---|---|
| Beamforming Feedback Matrix V for subcarrier k = scidx(1) | $N_a \times (b_\psi + b_\phi)/2$ | Compressed beamforming feedback matrix as defined in Table(order of angles in the compressed beamforming feedback matrix subfield) |
| Beamforming Feedback Matrix V for subcarrier k = scidx(2) | $N_a \times (b_\psi + b_\phi)/2$ | Compressed beamforming feedback matrix as defined in Table(order of angles in the compressed beamforming feedback matrix subfield) |
| Beamforming Feedback Matrix V for subcarrier k = scidx(Ns − 1) | $N_a \times (b_\psi + b_\phi)/2$ | Compressed beamforming feedback matrix as defined in Table(order of angles in the compressed beamforming feedback matrix subfield) |

Different from what are shown in Table 4, instead of providing feedback of an average SNR for each spatial stream, the method shown in Table 5 directly transmits SNR with respect to each sub-carrier. The SNR value with respect to each sub-channel index k is directly quantized to 8 bits and transmitted through the spatial stream; and at the same time, the compressed beamforming feedback matrix V is also transmitted through the spatial stream for each sub-carrier index k.

Different from the VHT systems using a frequency band of 5 GHz as defined in the existing IEEE 802.11ac, the total number of sub-channels employed in the sub 1 GHz can be relatively small since the employed frequency bandwidth is narrow. An accurate SNR value can be transmitted for each sub-carrier while feedback overhead is not so increased compared with the averaged SNR value and a delta SNR in accordance thereto.

In a channel state transmission method according to an embodiment of the present invention, a sub-carrier index is not specified for each sub-carrier but a sub-1 GHz system specifies a particular sub-carrier so that a beamforming feedback matrix is transmitted only for the corresponding sub-carrier.

Table 6 shows one example of a method for specifying a sub-carrier index and transmitting a beamforming feedback matrix only for the corresponding index. The index indicated in the table and the number Ng of neighboring sub-carriers used as one group can change as arbitrary values, which belongs to the technical scope of the present invention.

TABLE 6

| Channel Width | Ng | Ns | Subcarriers for which a Beamforming Feedback Matrix subfield is sent: scidx(0), scidx(1), ... scidx(Ns − 1) |
|---|---|---|---|
| 1 MHz | 1 | 24 | −13, −12, −11, −10, −9, −8, −6, −5, −4, −3, −2, −1, 1, 2, 3, 4, 5, 6, 8, 9, 10, 11, 12, 13 |
| | 2 | 12 | −13, −11, −9, −5, −3, −1, 1, 3, 5, 9, 11, 13 |
| | 4 | 8 | −13, −9, −5, −1, 1, 5, 9, 13 |
| | 8 | 6 | −13, −5, −1, 1, 5, 13 |
| 2 MHz | 1 | 30 | −28, −26, −24, −22, −20, −18, −16, −14, −12, −10, −8, −6, −4, −2, −1, 1, 2, 4, 6, 8, 10, 12, 14, 16, 18, 20, 22, 24, 26, 28 |
| | 2 | 16 | −28, −24, −20, −16, −12, −8, −4, −1, 1, 4, 8, 12, 16, 20, 24, 28 |
| | 4 | 10 | −28, −20, −12, −4, −1, 1, 4, 12, 20, 28 |
| | 8 | 6 | −28, −12, −1, 1, 12, 28 |
| 4 MHz | 1 | 58 | −58, −56, −54, −52, −50, −48, −46, −44, −42, −40, −38, −36, −34, −32, −30, −28, −26, −24, −22, −20, −18, −16, −14, −12, −10, −8, −6, −4, −2, 2, 4, 6, 8, 10, 12, 14, 16, 18, 20, 22, 24, 26, 28, 30, 32, 34, 36, 38, 40, 42, 44, 46, 48, 50, 52, 54, 56, 58 |
| | 2 | 30 | −58, −54, −50, −46, −42, −38, −34, −30, −26, −22, −18, −14, −10, −6, −2, 2, 6, 10, 14, 18, 22, 26, 30, 34, 38, 42, 46, 50, 54, 58 |
| | 4 | 16 | −58, −50, −42, −34, −26, −18, −10, −2, 2, 10, 18, 26, 34, 42, 50, 58 |
| | 8 | 10 | −58, −42, −26, −10, −2, 2, 10, 26, 42, 58 |
| 8 MHz | 1 | 122 | −122, −120, −118, −116, −114, −112, −110, −108, −106, −104, −102, −100, −98, −96, −94, −92, −90, −88, −86, −84, −82, −80, −78, −76, −74, −72, −70, −68, −66, −64, −62, −60, −58, −56, −54, −52, −50, −48, −46, −44, −42, −40, −30, −36, −34, −32, −30, −28, −26, −24, −22, −20, −18, −16, −14, −12, −10, −8, −6, −4, −2, 2, 4, 6, 8, 10, 12, 14, 16, 18, 20, 22, 24, 26, 28, 30, 32, 34, 36, 38, 40, 42, 44, 46, 48, 50, 52, 54, 56,58, 60, 52, 64, 66, 68, 70, 72, 74, 76, 78, 80, 82, 84, 86, 88, 90, 92, 94, 96, 98, 100, 102, 104, 106, 108, 110, 112, 114, 116, 118, 120, 122, 124, 126, 128 |
| | 2 | 62 | −122, −118, −114, −110, −106, −102, −98, −94, −90, −86, −82, −78, −74, −70, −66, −62, −58, −54, −50, −46, −42, −38, −34, −30, −26, −22, −18, −14, −10, −6, −2, 2, 6, 10, 14, 18, 22, 26, 30, 34, 38, 42, 46, 50, 54, 58, 62, 66, 70, 74, 78, 82, 86, 90, 94, 98, 102, 106, 110, 114, 118, 122 |
| | 4 | 32 | −122, −114, −106, −98, −90, −82, −74, −66, −58, −50, −42, −34, −26, −18, −10, −2, 2, 10, 18, 26, 34, 42, 50, 58, 66, 74, 82, 90, 98, 106, 114, 122 |
| | 8 | 18 | −122, −106, −90, −74, −58, −42, −26, −10, −2, 2, 10, 26, 42, 58, 74, 90, 106, 122 |
| 16 MHz | 1 | 244 | −250, −248, −246, −244, −242, −240, −238, −236, −234, −232, −230, −228, −226, −224, −222, −220, −218, −216, −214, −212, −210, −208, −206, −204, −202, −200, −198, −196, −194, −192, −190, −188, −188, −184, −182, −180, −178, −176, −174, −172, −170, −168, −166, −164, −162, −160, −158, −156, −154, −152, −150, −148, −146, −144, −142, −140, −138, −136, −134, −132, −130, −126, −124, −122, −120, −118, −116, −114, −112, −110, −108, −106, −104, −102, −100, −98, −96, −94, −92, −90, −88, −86, −84, −82, −80, −78, −76, −74, −72, −70, −68, −66, −64, −62, −60, −58, −56, −54, −52, −50, −48, −46, −44, −42, −40 −38, −36, −34, −32, −30, −28, −26, −24, −22, −20, −18, −16, −14, −12, −10, −8, −6, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 92, 94, 96, 98, 100, 102, 104, 106, 108, 110, 112, 114, 116, 118, 120, 122, 124, 126, 130, 132, 134, 136, 138, 140, 142, 144, 146, 148, 150, 152, 154, 156, 158, 160, 162, 164, 166, 168, 170, 172, 174, 176, 178, 180, 182, 184, 186, 188, 190, 192, 194, 196, 198, 200, 202, 204, 206, 208, 210, 212, 214, 216, 218, 220, 222, 224, 226, 228, 230, 232, 234, 236, 238, 240, 242, 244, 246, 248, 250 |

TABLE 6-continued

| Channel Width | Ng | Ns | Subcarriers for which a Beamforming Feedback Matrix subfield is sent: scidx(0), scidx(1), ... scidx(Ns − 1) |
|---|---|---|---|
| | 2 | 124 | −250, −246, −242, −238, −234, −230, −226, −222, −218, −214, −210, −206, −202, −198, −194, −190, −186, −182, −178, −174, −170, −166, −162, −158, −154, −150, −146, −142, −138, −134, −130, −126, −122, −118, −114, −110, −106, −102, −98, −94, −90, −86, −82, −76 −74, −70, −66, −62, −58, −54, −50, −46, −42, −38, −34, −30, −26, −22, −18,−14, −10, −6, 6, 10, 14, 18, 22, 26, 30, 34, 38, 42, 46, 50, 54, 58, 62, 66, 70, 74, 78, 82, 86, 90, 94, 98, 102, 106, 110, 114, 118, 122, 126, 130, 134, 138, 142, 146, 150, 154, 158, 162, 166, 170, 174, 178, 182, 186, 190, 194, 198, 202, 206, 210, 214, 218, 222, 226, 230, 234, 238, 242, 246, 250 |
| | 4 | 64 | −250, −242, −234, −226, −218, −210, −202, −194, −186, −178, −170, −162, −154, −146, −138, −130, −126, −118, −110, −102, −94, −86, −78, −70, −62, −54, −46, −38, −30, −22, −14, −6, 6, 14, 22, 30, 38, 46, 54, 62, 70, 78, 86, 94, 102, 110, 118, 126, 130, 138, 146, 154, 162, 170, 178, 186, 194, 202, 210, 218, 226, 234, 242, 250 |
| | 8 | 34 | −250, −234, −218, −202, −186, −170, −154, −138, −126, −110, −94, −78, −62, −46, −30, −14, −6, 6, 14, 30, 46, 62, 78, 94, 110, 126, 138, 154, 170, 186, 202, 218, 234, 250 |

Table 6 specifies indices of sub-carriers for which a beamforming feedback matrix subfield is sent. In an embodiment of the present invention, it is possible to calculate a beamforming feedback matrix with respect to a specified sub-carrier index only.

In Table 6, Ng represents the size of a group consisting of neighboring sub-carriers. Since the neighboring Ng subcarriers share a similar channel condition, it is assumed that they provide a single feedback value. Channel information feedback is provided in more detail for each sub-carrier as the Ng value becomes smaller; however, computational complexity can be increased. On the other hand, channel feedback becomes less accurate for each sub-carrier as the Ng value gets larger, but computational complexity can be lowered.

Different from the VHT systems adopting the existing IEEE 802.11ac standard, narrow bandwidth is employed for sub-1 GHz systems.

Table 6 illustrates a method for calculating a feedback matrix, where the feedback matrix is calculated when Ng parameter holds the largest value (for example, Ng=8) and a total number Ns of subcarrier indices (or tone indices) is 6 at 1 MHz; Ns is 6 at 2 MHz; Ns is 10 at 4 MHz; Ns is 18 at 8 MHz; and Ns is 34 at 16 MHz.

As another embodiment, Table 7 shows a method for transmitting feedback information by increasing the sub-carrier index interval throughout the whole indices, at which a beamforming feedback matrix is transmitted.

TABLE 7

| Channel Width | Ng | Ns | Subcarriers for which a Beamforming Feedback Matrix subfield is sent: scidx(0), scidx(1), ... scidx(Ns − 1) |
|---|---|---|---|
| 1 MHz | 1 | 12 | −13, −11, −9, −5, −8, −1, 1, 3, 5, 9, 11, 13 |
| | 2 | 8 | −13, −9, −5, −1, 1, 5, 9, 13 |
| | 4 | 6 | −13, −5, −1, 1, 5, 13 |
| | 8 | 4 | −13, −1, 1, 13 |
| 2 MHz | 1 | 16 | −28, −24, −20, −16, −12, −8, −4, −1, 1, 4, 8, 22, 16, 20, 24, 28 |
| | 2 | 10 | −28, −20, −12, −4, −1, 1, 4, 12, 20, 28 |
| | 4 | 6 | −28, −12, −1, 1, 12, 28 |
| | 8 | 4 | −28, −1, 1, 28 |
| 4 MHz | 1 | 30 | −58, −54, −50, −46, −42, −38, −34, −30, −26, −22, −18, −14, −10, −6, −2, 2, 6, 10, 24, 18, 22, 28, 30, 34, 36, 42, 46, 50, 54, 58 |
| | 2 | 16 | −58, −50, −42, −34, −26, −18, −10, −2, 2, 10, 18, 26, 34, 42, 50, 58 |
| | 4 | 10 | −58, −42, −26, −10, −2, 2, 10, 26, 42, 58 |
| | 8 | 6 | −58, −26, −2, 2, 26, 58 |
| 8 MHz | 1 | 62 | −122, −118, −114, −110, −106, −102, −98, −94, −90, −86, −82, −78, −74, −70, −66, −62, −58, −54, −50, −46, −42, −38, −34, −30, −26, −22, −18, −14, −10, −6, −2, 2, 6, 10, 14, 18, 22, 26, 30, 34, 38, 42, 46, 50, 54, 58, 62, 66, 70, 74, 78, 82, 86, 90, 94, 98, 102, 106, 110, 114, 118, 122 |
| | 2 | 32 | −122, −114, −106, −98, −90, −82, −74, −66, −58, −50, −42, −34, −26, −18, −10, −2, 2, 10, 18, 26, 34, 42, 50, 58, 66, 74, 82, 90, 98, 106, 114, 122 |
| | 4 | 18 | −122, −106, −90, −74, −58, −42, −26, −10, −2, 2, 10, 26, 42, 58, 74, 90, 106, 122 |
| | 8 | 10 | −122, −90, −58, −26, −2, 2, 26, 58, 90, 122 |
| 16 MHz | 1 | 124 | −250, −246, −242, −238, −234, −230, −226, −222, −218, −214, −210, −206, −202, −196, −194, −190, −186, −182, −176, −174, −170, −166, −162, −158, −154, −150, −146, −142, −138, −134, −130, −126, −122, −118, −114, −110, −106, −102, −96, −94, −90, −86, −82, −78, −74, −70, −66, −62, −58, −54, −50, −46, −42, −38, −34, −30, −26, −22, −18, −14, −10, −6, 6, 10, 14, 18, 22, 26, 30, 34, 38, 42, 46, 50, 54, 58, 62, 66, 70, 74, 78, 82, 86, 90, 94, 98, 102, 106, 110, 114, 118, 122, 126, 130, 134, 136, 142, 146, 150, 154, 158, 162, 166, 170, 174, 178, 182, 186, 190, 194, 198, 202, 206, 210, 214, 218, 222, 226, 230, 234, 238, 242, 246, 250 |
| | 2 | 54 | −250, −242, −234, −226, −218, −210, −202, −194, −186, −178, −170, −162, −154, −146, −138, −130, −126, −118, −110, −102, −94, −86, −78, −70, −62, −54, −46, −38, −30, −22, −14, −6, 6, 14, 22, 30, 38, 46, 54, 62, 70, 78, 86, 94, 102, 110, 118, 126, 130, 138, 146, 154, 162, 170, 178, 186, 194, 202, 210, 218, 226, 234, 242, 250 |
| | 4 | 34 | −250, −234, −218, −202, −186, −170, −154, −138, −126, −110, −94, −78, −62, −46, −30, −14, −6, 6, 14, 30, 46, 62, 78, 94, 110, 126, 138, 154, 170, 186, 202, 218, 234, 250 |
| | 8 | 10 | −250, −218, −186, −154, −126, −94, −62, −30, −6, 6, 30, 62, 94, 126, 154, 186, 218, 250 |

Table 7 illustrates a method for calculating and transmitting a beamforming feedback matrix, where the beamforming feedback matrix is calculated when Ng parameter holds the largest value (for example, Ng=8) and a total number Ns of subcarrier indices is 4 at 1 MHz; Ns is 4 at 2 MHz; Ns is 6 at 4 MHz; Ns is 10 at 8 MHz; and Ns is 18 at 16 MHz.

Table 7 shows one example of a method for calculating feedback with much less feedback complexity by taking into account the characteristics of sub-1 GHz systems where the available bandwidth is narrow.

As described above, Tables 6 and 7 show examples of a method for transmitting a beamforming feedback matrix with respect to predefined sub-carrier indices only, and the sub-carrier indices can be different from those values of Tables 6 and 7. Also, the number Ng of groups can be different from those shown in Tables 6 and 7.

In a method for providing SNR as feedback, the method illustrated in Tables 6 and 7 is based on the scheme that the SNR of a spatial stream is provided as feedback only for a sub-carrier corresponding to the sub-carrier index. In other words, instead of calculating SNR for the whole sub-carriers as described in Tables 4 and 5, it is possible to measure channel state information by calculating SNR information with respect to a particular sub-carrier.

The sub-carrier index by which SNR of a spatial stream is provided as feedback can use the same value as the sub-carrier index to be used for providing a beamforming feedback matrix as feedback. In this case, the sub-carrier index by which the SNR is provided as feedback and the sub-carrier index by which the beamforming feedback matrix is provided as feedback can be determined according to the same table.

The sub-carrier index by which SNR of a spatial stream is provided as feedback can be specified by using a different table. Suppose the sub-carrier index interval at which SNR is provided as feedback is set differently from the sub-carrier index interval at which a beamforming feedback matrix is provided as feedback. In case variation of SNR for each sub-carrier differs significantly from the variation of the beamforming feedback matrix for each sub-carrier, channel state information of relatively more sub-carriers can be obtained. In other words, by using the method above, an advantageous effect of lowering feedback complexity can be obtained while similar performance can be achieved, which is obtained when SNR information and beamforming feedback matrix information are calculated for the whole sub-carriers and provided as feedback.

According to an embodiment of the present invention, at the time each STA performs association with an AP, the STA can inform the AP about the Ng value meant to calculate a sub-carrier index with which feedback information as shown in Table 7 or 8 is calculated through a particular information element such as a capability element.

Figure 5:
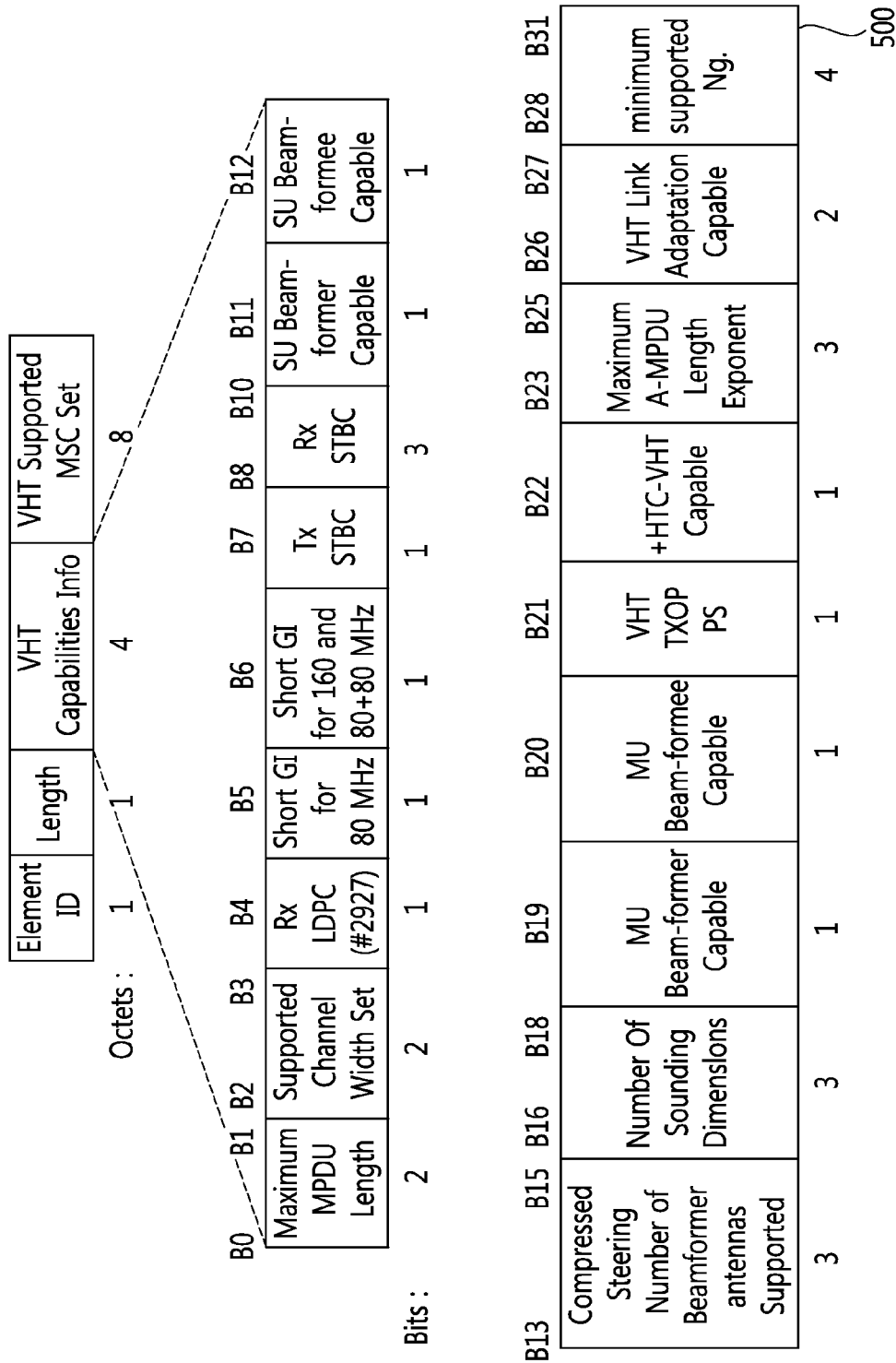
FIG. 5 illustrates a VHT capability element format according to an embodiment of the present invention.

FIG. 5 illustrates a VHT capability element format according to an embodiment of the present invention.

With reference to FIG. 5, VHT capability element is information element carrying information about operations that can be carried out at the STA. Information about Ng can be transmitted being included the bits from B28 to B31 reserved in the VHT capability element. For example, a field such as a minimum supported Ng 500 is created and can be included in the VHT capability element format.

The minimum supported Ng 500 can be used to transmit information about the value of Ng supported minimally by the STA. For example, if it is assumed that the minimum supported Ng is set to 2 for transmission, an AP can obtain information that the STA supports only when Ng is 2 or more and does not support when Ng is 1. For some STAs, due to computational complexity, it is often the case that feedback transmission of a large number of data according to a low Ng value is not possible. In this situation, the STA, by informing the AP about the situation, can provide information about sub-carrier indices by which the STA can provide the maximum feedback.

In another example, the AP can transmit information about Ng to the STA while performing the sounding procedure described in FIG. 1.

Figure 6:
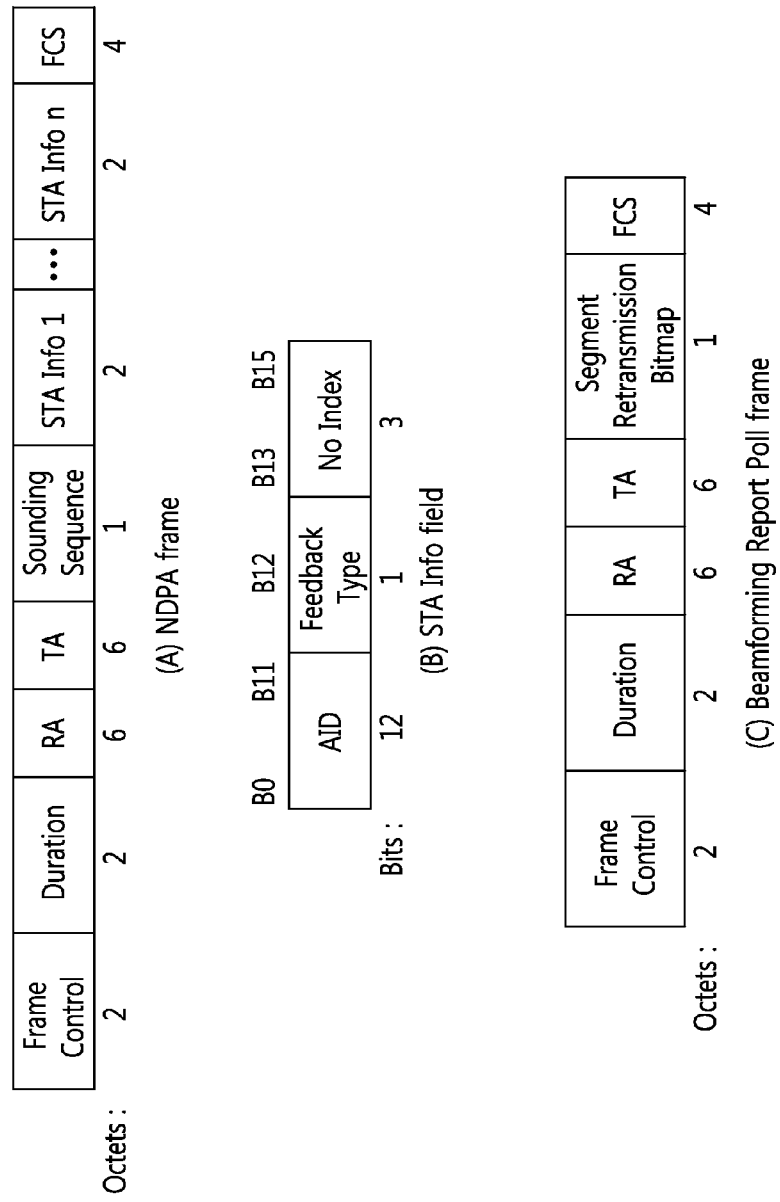
FIG. 6 illustrates an NDPA frame A, B and a beamforming report poll frame C transmitted from an Access Point (AP) used in a sounding process according to an embodiment of the present invention.

FIG. 6 illustrates an NDPA frame A, B and a beamforming report poll frame C transmitted from an Access Point (AP) used in a sounding process according to an embodiment of the present invention.

Additional field information, for example, information about recommended Ng can be included in the NDPA frame A, B or beamforming report poll frame C. The recommended Ng information is an example of Ng-related information transmitted from the AP, and information related to another Ng can be transmitted to the STA. Ng-related information can be defined as a term of sub-carrier grouping information.

The recommended Ng information is the information about Ng value recommended by the AP. The STA receives the recommended Ng information transmitted from the AP and configures the VHT compressed beamforming report frame by using an Ng value based on the recommended information and provides channel state information to the AP as feedback information.

The tone shift (ishift) can include information about the amount of change of a sub-carrier index by which feedback information (for example, VHT compressed beamforming report field) is created and transmitted.

For example, if ishift is 0, the original sub-carrier index used for transmission of feedback information is used; and therefore, the STA has to create and transmit feedback information with respect to the subcarrier index. If ishift is 1, the STA has to create and transmit feedback contents with respect to the sub-carrier index shifted by +1 (or −1) from the original sub-carrier index with which the feedback information is transmitted. In the same manner, if ishift is 2, the STA has to create and transmit feedback contents with respect to the sub-carrier index shifted by +2 (or −2) from the original sub-carrier index with which the feedback information is transmitted. The ishift is an example of a parameter intended to configure the sub-carrier index; according to an embodiment of the present invention, a different method can be used to change the sub-carrier index, which also belongs to the technical scope of the present invention.

In case the channel bandwidth is narrow as in the sub-1 GHz band, an interval between sub-carrier indices at which feedback information is provided in consideration of complexity can be made large. In case a parameter, which changes the sub-carrier providing feedback, is newly defined, the feedback can be provided by various sub-carriers in a channel condition where variation per hour is not large and thus, feedback granularity can be increased.

Figure 7:
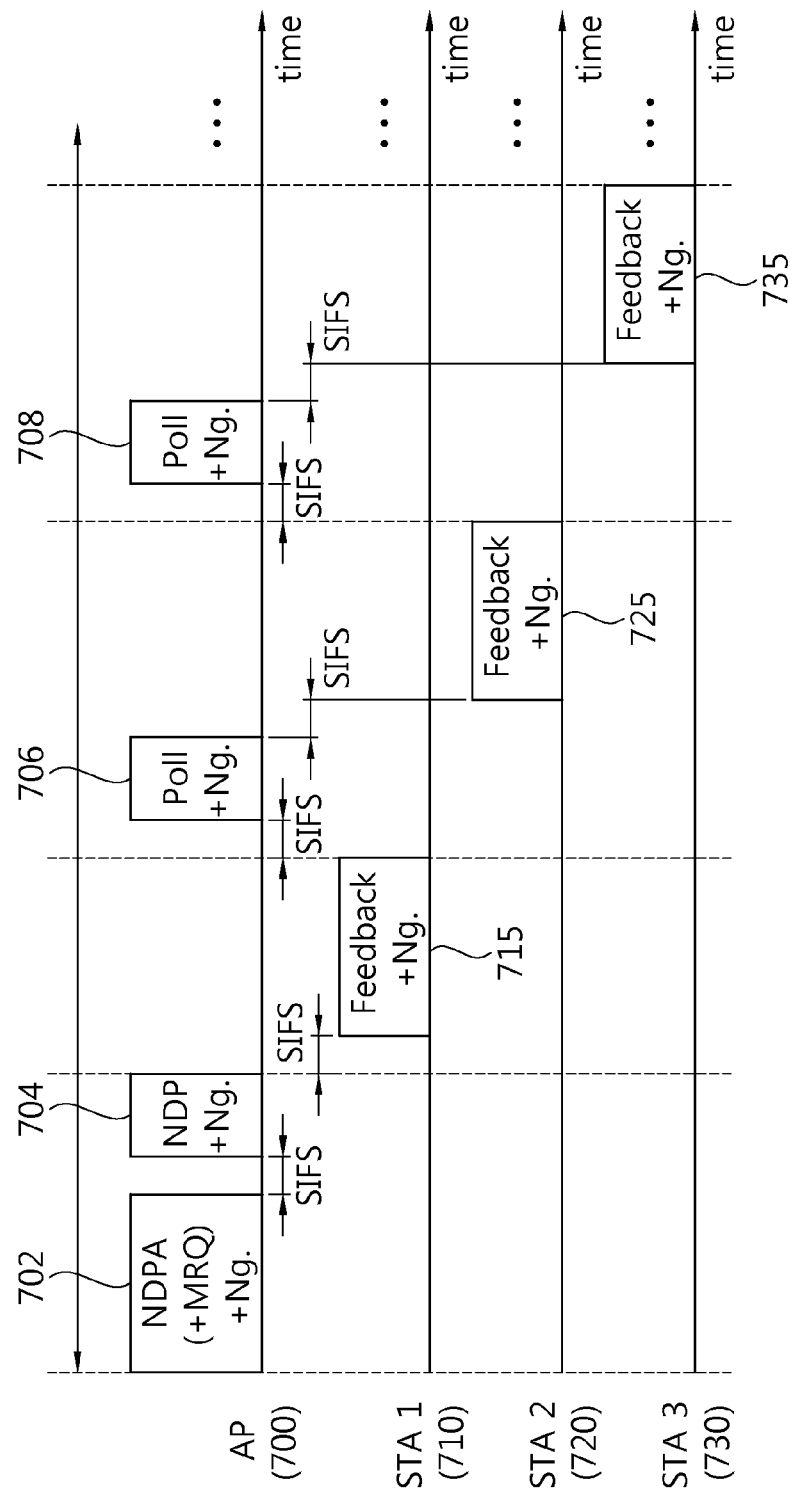
FIG. 7 illustrates a method for transmitting Ng information using a sounding protocol according to an embodiment of the present invention.

FIG. 7 illustrates a method for transmitting Ng information using a sounding protocol according to an embodiment of the present invention.

With reference to FIG. 7, the Ng information can be transmitted being included in the NDPA frame 702 or beamforming report full frame 706, 708 described in FIG. 6.

(1) Ng-related information can be transmitted being included in the NDPA frame 702.

The Ng-related information can be the Ng value requested by the AP 700, for example, as in the recommended Ng information described above.

(2) STA 1 710 which has received the Ng-related information transmits to the AP 700 feedback information 715 including confirm information for the Ng-related information as feedback information.

STA 1 710 can provide feedback information including the confirm information about the Ng information recommended by the AP 700. For example, in case beamforming report is carried out by incorporating the recommended Ng and tone shift value (ishift), which has been transmitted being included in the NDPA frame, directly into the VHT compressed beamforming report frame, the beamforming report confirms that the recommended Ng transmitted from the AP 700 has been used directly. This method is only an example, and different field information can be additionally defined to indicate that the Ng value recommended by the AP 700 is used directly.

In case a beamforming report different from the Ng recommended by the AP 700 is carried out, a VHT compressed beamforming report frame including a value different from the Ng value recommended by the AP 700 can be transmitted. As another method, in case the Ng value recommended by the AP cannot be used, the VHT compressed beamforming report frame can be transmitted with the corresponding part of the information filled with null data. Ng-related information can be transmitted by not only the NDPA frame 702 but also the beamforming report poll frame 706, 708.

(3) The beamforming report poll frame 706, 708 including Ng-related information is transmitted to the STA 720, 730.

As is done through the NDPA frame, the Ng information can be transmitted to the STA 720, 730 through the beamforming report poll frame 706, 708.

(4) The STA 720, 730 which has received Ng-related information transmits to the AP 700 feedback information including confirm information with respect to the Ng-related information.

As in the feedback method with respect to the NDPA including the Ng value, the VHT compressed beamforming report frame including confirm information about the Ng-related information can be transmitted to the AP 700.

Figure 8:
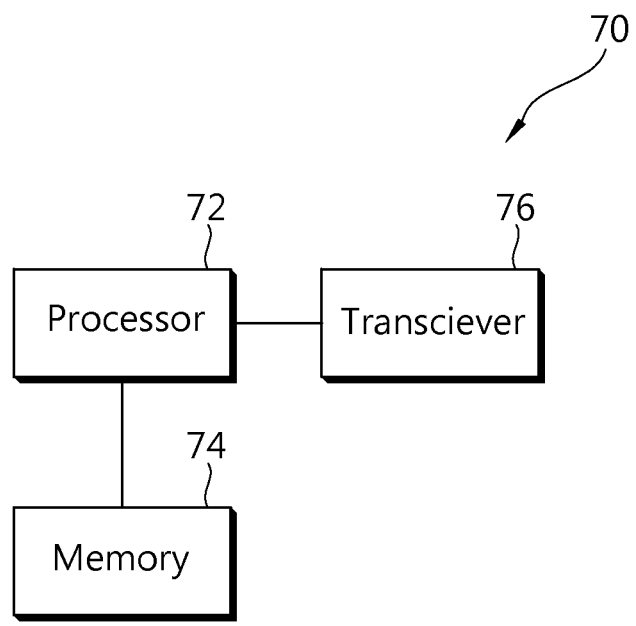
FIG. 8 is a block diagram illustrating a wireless device to which an embodiment of the present invention can be applied.

FIG. 8 is a block diagram illustrating a wireless device to which an embodiment of the present invention can be applied.

The wireless device 70 is a terminal to which the embodiments described above can be applied, which can be an AP or non-AP station.

The wireless device 70 comprises a processor 72, a memory 74, and a transceiver 76. The transceiver 76, which transmits or receives a radio signal, is implemented in the physical layer of the IEEE 802.11. The processor 72, being connected functionally to the transceiver 76, implements the MAC layer and the physical layer of the IEEE 802.11. According to an embodiment of the present invention, the transceiver 76 is implemented to receive a Null Data Packer (NDP) frame; and the processor 72 is implemented to calculate Signal-to-Noise Ratio (SNR) information based on sub-carrier information of at least one spatial stream which has transmitted the received NDP frame and to calculate a compressed beamforming feedback matrix based on the sub-carrier information used for transmission of the spatial stream. In other words, the processor 72 can be implemented to perform the embodiments of the present invention described above.

The processor 72 and/or the transceiver 76 can include Application-Specific Integrated Circuit (ASIC), other chipsets, logic circuit, and/or data processing apparatus. The memory 74 can include Read-Only Memory (ROM), Random Access Memory (RAM), flash memory, memory card, storage medium and/or other storage devices. In case the embodiments are implemented in the form of software, the techniques described above can be implemented in a module (procedure, function, and so on) which carries out the function described above. The module can be stored in the memory 74 and can be carried out by the processor 72. The memory 74 can be installed inside or outside the processor 72, and can be connected to the processor 72 through various, well-known means.

What is claimed is:

1. A method for transmitting channel state information, comprising:
   receiving a Null Data Packet Announcement (NDPA) frame including recommended grouping information;
   receiving a Null Data Packet (NDP) frame;
   determining Signal-to-Noise Ratio (SNR) information for a first sub-carrier of a spatial stream which has transmitted the NDP frame; and
   determining a compressed beamforming feedback matrix including channel state information for a second sub-carrier of the spatial stream,
   wherein each of the first sub-carrier and the second sub-carrier is determined based on the recommended grouping information, and
   wherein the recommended grouping information includes information related to grouping of a plurality of subcarriers to determine the first sub-carrier and the second sub-carrier,
   wherein the SNR information is determined based on a variance between a SNR value of the first sub-carrier and an average value of SNR of sub-carriers used to transmit the at least one spatial stream.

2. The method of claim 1,
   wherein the NDPA frame further includes tone shift information,
   wherein the tone shift information includes information related to changing of a sub-carrier index of each of the first sub-carrier and the second subcarrier, and wherein the sub-carrier index of each of the first sub-carrier and the second subcarrier is shifted based on the tone shift information.

3. The method of claim 1, further comprising:
   transmitting capability information for grouping of sub-carriers to determine the SNR information and the compressed beamforming feedback matrix,
   wherein the recommended group information is determined based on the capability information.

4. A terminal for transmitting channel state, the terminal comprising:
   a radio frequency (RF) unit configured to transmit or receive RF signal; and a processor configured to:
   receive a Null Data Packet Announcement (NDPA) frame including recommended grouping information,
   receive a Null Data Packet (NDP) frame,
   determine Signal-to-Noise Ratio (SNR) information for a first sub-carrier of a spatial stream which has transmitted the received NDP frame, and
   determine a compressed beamforming feedback matrix including channel state information for a second sub-carrier of the spatial stream,
   wherein each of the first sub-carrier and the second sub-carrier is determined based on the recommended grouping information, and
   wherein the recommended grouping information includes information related to grouping of a plurality of subcarriers to determine the first sub-carrier and the second sub-carrier,
   wherein the SNR information is determined based on a variance between a SNR value of the first subcarrier and an average value of SNR of sub-carriers used to transmit the at least one spatial stream.

5. The terminal of claim 4, wherein the NDPA frame further includes tone shift information,
   wherein the tone shift information includes information related to changing of a sub-carrier index of each of the first sub-carrier and the second subcarrier, and wherein the sub-carrier index of each of the first sub-carrier and the second subcarrier is shifted based on the tone shift information.

6. The terminal of claim 4, wherein the processor is further configured to transmit capability information for grouping of subcarriers to determine the SNR information and the compressed beamforming feedback matrix, wherein the recommended group information is determined based on the capability information.

* * * * *